United States Patent [19]
Aldrich et al.

[11] 3,720,208
[45] March 13, 1973

[54] UNDERWATER SPACE SUIT PRESSURE CONTROL REGULATOR

[75] Inventors: Billy R. Aldrich, Huntsville; Charles R. Cooper, John R. Rasquin, both of Madison, all of Ala.

[73] Assignee: The United States of America as represented by the Administrator of the National Aeronautics and Space Administration, Washington, D.C.

[22] Filed: Nov. 2, 1971

[21] Appl. No.: 195,061

Related U.S. Application Data

[62] Division of Ser. No. 869,260, Oct. 24, 1969, Pat. No. 3,636,966.

[52] U.S. Cl.................128/142.5, 2/2.1 A, 137/538
[51] Int. Cl. ..............................................A61m 16/00
[58] Field of Search........128/1 A, 142.5, 142.2, 142; 2/2.1 A, 2.1 R; 137/516.13, 516.15, 538

[56] References Cited

UNITED STATES PATENTS 3,103,927   9/1963   Henneman ........................128/142.5
3,338,263   8/1967   Altmeppen........................137/538 X
3,077,881   2/1963   Sprague..............................128/142.5
2,667,892   2/1934   Gentzel ..............................137/473

*Primary Examiner*—Richard A. Gaudet
*Assistant Examiner*—G. F. Dunne
*Attorney*—L. D. Wofford, Jr. et al.

[57] ABSTRACT

A device for regulating the pneumatic pressure in a ventilated space suit relative to the pressure imposed on the suit when being worn by a person underwater to simulate space environment for testing and experimentation. A box unit located on the chest area of the suit comprises connections for suit air supply and return lines and carries a regulator valve that stabilizes the air pressure differential between the inside and outside of the suit. The valve and thus suit pressure is controlled by the suit occupant and the valve includes a mechanism for quickly dumping the suit pressure in case of emergency. Pressure monitoring and relief devices are also included in the box unit.

3 Claims, 4 Drawing Figures

PATENTED MAR 13 1973 3,720,208

BILLY R. ALDRICH
CHARLES R. COOPER
JOHN R. RASQUIN
INVENTORS

BY Wayland H. Riggins
ATTORNEY

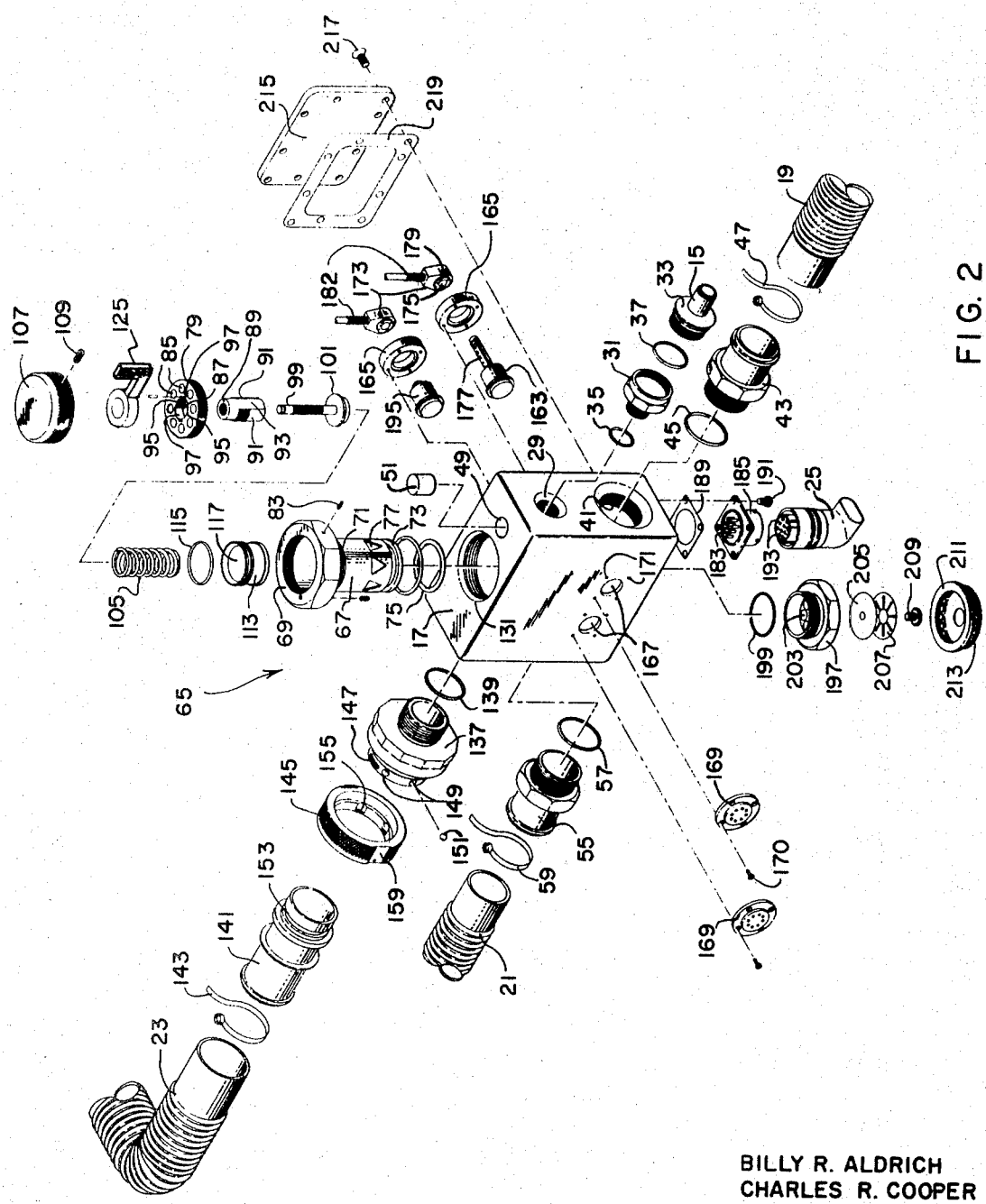

UNDERWATER SPACE SUIT PRESSURE CONTROL REGULATOR

CROSS REFERENCE TO RELATED APPLICATIONS

The invention described herein is a division of application Ser. No. 869,260, filed Oct. 24, 1969 now U.S. Pat. No. 3,636,966.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates generally to pressure regulating devices and more particularly to a device for regulating and monitoring pneumatic pressure in an underwater suit.

An important activity associated with manned exploration of space is that of creating an environment that simulates the zero gravity environment of space for purposes such as training astronauts and testing equipment under conditions matching the space environment as nearly as possible. One of the principal methods used for simulating the weightless condition of space environment involves the provision of a very large tank of water wherein the person undergoing training for space travel is submerged while wearing a space suit. These water tank facilities are known as neutral buoyancy facilities in that the forces acting on the submerged persons and equipment are balanced so that a weightless condition is simulated.

The space suits worn by persons engaging in underwater simulation operations enclose the entire body and are pressurized with air internally to ventilate the suit for cooling purposes and to circulate breathing air through the face-covering part of the suit. The air pressure source is located above water and the air is supplied through a flexible line to the submerged space suit occupant. The air is circulated through the suit and exhausted above water through a flexible exhaust line. It is necessary to maintain a steady pressure differential between the interior of the space suit and the surrounding water. It is preferable that the occupant of the space suit have immediate control over the suit pressure since this enhances his confidence and effectiveness. Additionally, it is desirable that means be provided on the space suit for indicating the suit pressure and water depth to the monitoring and recording station outside of the water.

SUMMARY OF THE INVENTION

The invention comprises a box unit for positioning on the chest area of a space suit worn during underwater simulation activity and includes connections for air supply and exhaust lines for the suit air flow system. The box unit contains a pressure regulator valve through which the air in the suit flow system must pass. This valve has a spring loaded piston the position of which determines the amount of air flow space through the valve. One end of the piston is exposed to the ambient water pressure and the other end is exposed to the suit air pressure. The piston is adjustably biased toward the closed position of the valve to develop and maintain the desired pressure differential between the suit pressure and the ambient water pressure. The suit pressure may be varied or dumped completely by the occupant of the suit by the manipulation of controls incorporated in the regulator valve. The box unit also contains means for continuously monitoring the suit pressure and water depth by a station outside of the water.

Accordingly it is a general object of the present invention to provide an improved pressure control regulator for a ventilated underwater suit.

A more specific object of the invention is to provide a device for regulating and monitoring the pneumatic pressure in a space suit worn underwater to simulate zero gravity environment.

Another object of the invention is to provide a pressure control regulator for maintaining a constant pressure differential between the inside of an underwater suit and the water around the suit whereby the suit pressure may be varied or quickly dumped entirely by the occupant of the suit.

These and other objects and advantages of the invention will become apparent upon reference to the following specification, attendant claims and drawing.

BRIEF DESCRIPTION OF THE DRAWING

FIG. 2 is an exploded view of the pressure control regulator assembly of FIG. 1.

DESCRIPTION OF THE PREFERRED EMBODIMENT

Figure 1:
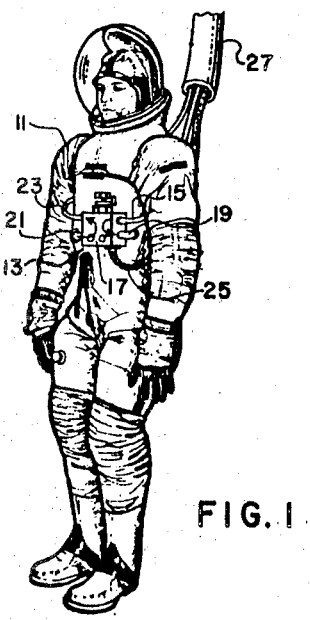
FIG. 1 is a perspective view of an occupied space suit having a pressure control regulator assembly positioned on the chest area of the suit.

Referring to FIG. 1, therein is shown a space suit 11 equipped with a pressure control regulator assembly 13 positioned on the chest area of the suit occupant. The space suit 11 is of the type worn by astronauts during space travel and the pressure control regulator assembly 13 is part of an air flow system for pressurizing and ventilating the suit while it is being worn by a person submerged underwater to experience a simulated weightless environment similar to the environment in outer space. The entire body of the occupant is enclosed by the suit and the suit is pneumatically pressurized inside so that air is circulated within the suit for cooling the occupant and supplying breathing air to the face area of the suit. To accomplish proper ventilation of the suit 11, it is necessary to maintain a steady pressure differential between the inside of the suit and the water surrounding the suit. Moreover, it is desirable that the occupant of the suit have immediate control over the suit pressure.

As shown in FIG. 1, a main air supply line 15 is connected to a box unit 17 of the pressure control regulator assembly 13. The supply air flows through the box unit and into the suit 11 through a suit air supply line 19. After circulating through the suit 11 the air is returned to the box unit 17 through a suit exhaust line 21 and from the box unit to an above water station through a main exhaust line 23. A flexible electrical conduit 25 leads out from the bottom of the box unit 17 and extends to an above water station to conduct pressure monitoring signals as will be explained hereinafter. The air lines 15 and 23 and the electrical conduit 25 merge into a tube 27 behind the space suit and extend to a station outside of the water.

Figure 3:
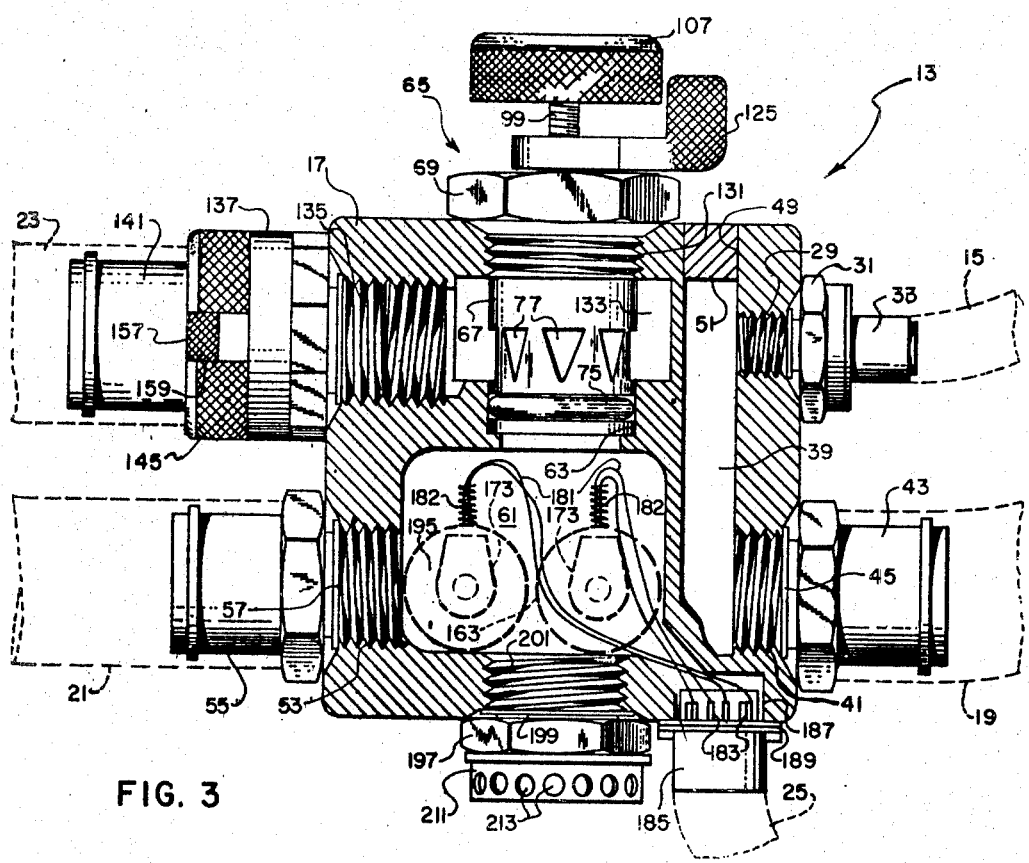
FIG. 3 is a cross sectional view of the pressure control regulator assembly of FIG. 1.

Referring to FIGS. 2 and 3, the box unit 17 comprises a threaded opening 29 to which is connected the main air supply line 15 through fittings 31 and 33 and sealing rings 35 and 37. The threaded opening 29 opens into a passageway 39 that extends from the opening 29 to a second threaded opening 41 to which the suit supply line 19 is joined by a fitting 43 and associated sealing ring 45 and clamp strap 47. The passageway 39 has an access opening 49 in the top of the box unit 17 which is closed by a plug 51.

Figure 4:
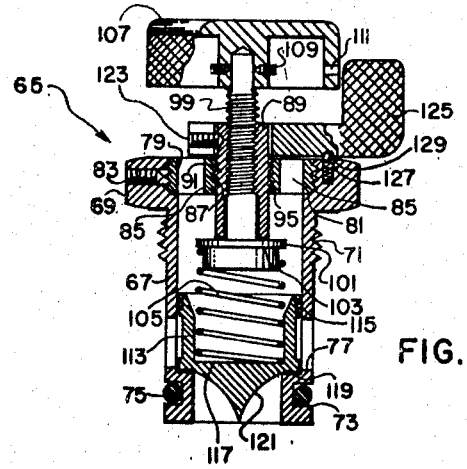
FIG. 4 is an enlarged cross sectional view of a regulator valve assembly incorporated in the pressure control regulator assembly of FIG. 1.

In the side of the box unit opposite the openings 29 and 41 is a threaded opening 53 that receives the suit exhaust line 21, the latter being connected by a fitting 55, sealing ring 57 and clamp strap 59. The opening 53 enters a chamber 61 in the box unit 17. The upper wall of the chamber 61 has an opening 63 therethrough in which is fitted the lower portion of a pressure regulator valve assembly 65 the details of which will now be described with particular reference to FIGS. 2 and 4.

The pressure regulator valve assembly 65 includes a cylinder 67 having an integral head 69 and external threads 71. A groove 73 near the lower end of the cylinder contains a sealing ring 75 and the wall of the cylinder above the groove 73 has a series of circumferentially spaced triangular openings 77 therethrough, there being eight such openings in the disclosed embodiment. Each of the openings 77 gradually increases in area from the lower apex to the top side of the opening.

The head 69 of the cylinder 67 is threaded internally to receive in threaded engagement an end fitting 79. A shoulder 81 of the cylinder 67 causes the outer surface of the fitting 79 to be flush with the end of the head 69 when tightly screwed into the cylinder. A set screw 83 prevents rotation of the fitting 79.

Holes 85 are formed in the fitting 79 for a reason to be subsequently explained, and an opening 87 in the center of the fitting receives a sleeve 89. The outside of the sleeve 89 has two opposite raised portions 91 (FIG. 2) on which are formed threads over an arc segment of substantially 65 degrees and between the portions 91 are opposite slots 93. Likewise, the wall of the opening 87 in the fitting 79 has two opposed threaded portions 95 corresponding to the threaded portions on the sleeve 89 and defining opposed slots 97. Thus the threaded engagement between the sleeve 89 and the fitting 79 is made by inserting the sleeve into the fitting with the threaded portions 91 of the sleeve occupying the slots 97 of the fitting. When the threaded portions 91 of the sleeve 89 are matched with the threaded portions 95 of the fitting 79 the sleeve is rotated 65 degrees to secure the sleeve in the fitting. This manner of joining the sleeve and fitting permits a quick and easy release of the sleeve which is very desirable for reasons to be explained.

The sleeve 89 receives a stem 99 having a base 101 in which is formed a seat 103 for engagement with a spring 105. The stem 99 is in threaded engagement with the sleeve 89 and may be adjusted longitudinally by being rotated with a knob 107 secured to the stem by set screws 109 accessible through holes 111 in the knob.

A piston 113 provided with a sealing ring 115 is fitted in the cylinder 67 and has a socket 117 therein that receives the spring 105. The piston is urged toward a cylinder stop portion 119 by the spring 105, and the degree of spring pressure against the piston is adjusted by rotation of the stem 99. The lower end of the piston has an annular concave portion 121 that converges to a point to present a streamlined surface for the purpose of lowering the resistance to the passage of air around the end of the piston and keeping it centered. The triangular openings 77 are closed by the piston when the piston is bearing on the cylinder stop 119.

Clamped to the upper end of the sleeve 89 by a set screw 123 is a lever 125 by which the sleeve is rotated 65 degrees to promptly connect or disconnect the sleeve to the fitting 79 as previously explained. The lever 125 is stabilized in the desired position by a spring-urged ball 127 that mates with a recess 129 in the lever.

Referring to FIG. 3, the regulator valve assembly 65 is fixed in a threaded opening 131 in the top of the box unit 17 with the lower portion of the cylinder 67 extending into the opening 63. Between the openings 63 and 131 of the box unit 17 an enlarged space forms on annular passageway 133 that communicates with the triangular openings 77 in the cylinder 67. The passageway 133 also communicates with a threaded opening 135 to which is connected the main air exhaust line 23. A fitting 137 provided with a sealing ring 139 screws into the opening 135. The exhaust line 23 fits over a second fitting 141, being clamped thereto by a strap 143. The fitting 141 plugs into the outer end of the fitting 137.

A quick-disconnect coupling is employed between the fitting 137 and 141 comprising a retaining ring 145 that is mounted for limited rotation on the outer end of the fitting 137 by pins (not shown) projecting into slots 147 (FIG. 2) Openings 149 in the fitting 137 contain balls, such as 151, that are cammed into a groove 153 in the fitting 141 by rotation of the ring 145 to lock the fittings 137 and 141 together. Rotation of the ring to the unlocking position permits the balls 151 to move into recesses 155 in the ring 145 and release the fitting 141. A locking tab 157 (FIG. 3) fits slidably in a dovetail groove 159 in the ring 145 and the end of the tab slides in and out of a slot (not shown) in the fitting 137 to secure the retaining ring in the locked position. The tab 157 is slidably held in the groove 159 by spring loaded pins (not shown) engaging the tab and the fitting 137. More detailed description and illustration of the quick-disconnect coupling between the fittings 137 and 141 is not set forth since such detail is not essential to the invention.

The air flow into and out of the box unit 17 is as follows: Air enters the passageway 39 through the main air supply line 15 and flows into the space suit through the suit supply line 19. After circulating through the suit the air enters the chamber 61 through the suit exhaust line 21 and flows into the regulator valve assembly 65 around the streamlined end 121 of the piston 113. Subsequently the air flows out of the valve assembly 65 through the triangular openings 77 and enters the main exhaust line 23 where it is conducted out of the water.

The ambient water pressure in the vicinity of the space suit is applied against the piston 113 through the holes 85 of the fitting 79. This water pressure acts on the same end of the piston as does the spring 105 and it is apparent that the air pressure in the chamber 61, and thus in the space suit, must exceed the combined pressure imposed by the water and the spring before the piston will be moved toward the spring and permit air flow through the triangular openings 77.

In underwater zero gravity simulation the rate of air flow through the space suit is constant and the resistance to the air flow is regulated by adjusting the stem 99 to vary the spring pressure on the piston 113. As the spring pressure increases the pressure in the space suit rises. For optimum underwater simulation of weightlessness the pressure in the space suit should exceed the ambient water pressure by 3.5 p.s.i.

The triangular configuration of the openings 77 provides a minimum ratio of air flow to piston movement at the lower portion of the triangular holes and maximum ratio of air flow to piston movement at the upper portion. This configuration of the openings 77 causes the air flow space to change gradually, thus avoiding abrupt changes in the resistance to air flow through the valve 65 and attendant oscillation of the piston 113.

An emergency situation may arise when it would be necessary to abruptly drop the spring pressure imposed on the piston 113 and thereby drop the pressure within the space suit. This may be accomplished by the suit occupant by rotating the lever 125 by 65 degrees and thus releasing the threaded connection between the sleeve 89 and the fitting 79. The stem 99 will then immediately move away from the piston 113 and permit the piston to shift and fully open the triangular openings 77. The spring pressure may be promptly restored by re-establishing the threaded connection between the sleeve 89 and fitting 79 with the lever 125.

A depth pressure transducer 163 is fitted in a mounting ring 165 and secured in the box unit chamber 61 with the end of the transducer disposed in an opening 167 in the wall of the chamber. A perforated strainer 169 covers the end of the transducer and is connected to the mounting ring 165 by screws 170 extending through holes 171. Electrical connection to the transducer 163 is made by a receptacle plug 173 having a hole 175 therethrough that receives a tube 177 of the transducer and has a plurality of sockets 179 that receive corresponding prongs (not shown) on the transducer.

Conducting wires 181 (FIG. 3) supported in a spiral spring 182 on the plug 173 extend between the plug 173 and terminals 183 of a plug 185 mounted in an opening 187 in the box unit 17. The plug 185 constitutes the box unit connection for the electrical line 25 that extends to a monitoring station outside of the water. The plug 185 is provided with a gasket 189 and is joined to the box unit by screws 191. The end of the electrical line 25 has multiple sockets 193 that mate with corresponding prongs (not shown) in the plug 185.

A second transducer 195 is also mounted in the box unit chamber in the same manner as the transducer 173. The transducer 195 is a delta pressure transducer adapted to indicate the difference between the pressure in the space suit and the ambient water pressure. The signals from the transducer 195 are also conducted through the electrical line 25 to the monitoring station An additional safety measure in the form of a pressure relief valve is included in the box unit 17 to guard against the possibility of an excessive pressure buildup in the space suit due to a failure in the system. The relief valve comprises a threaded fitting 197 equipped with a sealing ring 199 and being screwed into an opening 201 in the box unit chamber 61. A series of openings 203 are formed in the outer end of the fitting 197 and a rubber diaphragm 205 covers the openings 203. A slotted spring disk 207 is pressed against the diaphragm by a screw 209 that screws into a threaded opening (not shown) in the center of the fitting 197. A cover 211 having a series of apertures 213 therein is positioned over the spring disk 207 and screwed to the fitting 197.

The spring disk 207 is normally shaped slightly conically with the apex at the center of the disk pointing outwardly of the box unit chamber 61. However, if the pressure in the chamber exceeds a predetermined amount the spring disk will snap outwardly. Air flow will then be permitted through the valve to relieve the excess pressure in the space suit.

The box unit chamber 61 has a large access opening (not shown) on the side thereof opposite the openings 167. This access opening is closed by a cover plate 215 (FIG. 2) with screws 217 and associated gasket 219.

We claim:

1. A fluid flow system for supplying and exhausting gas to and from a ventilated underwater space suit comprising:

a box unit positioned on the chest area of said suit;

a main gas supply line connected to said box unit and a suit gas supply line connected to said box unit and said suit;

a passageway in said box unit between said main gas supply line connection and said suit supply line connection;

a main exhaust line connected to said box unit and a suit exhaust line connected to said box unit and said suit;

a gas exhaust passageway in said box unit between said suit exhaust line connection and said main exhaust line connection;

means for regulating the resistance to gas flow through said gas exhaust passageway;

said regulating means comprising a cylinder mounted in said gas exhaust passageway and having a gas receiving end including an opening through which exhaust gas must pass;

the end of said cylinder opposite said receiving end having an opening externally of said fluid flow system adapted for exposure to the ambient water pressure around said suit;

a piston movably disposed in said cylinder between said ends thereof;

the wall of said cylinder between said ends thereof having a fluid exit opening therein;

said fluid exit opening communicating with said main exhaust line;

means for adjustably interposing said piston between said receiving end and said exit opening of said cylinder whereby resistance to fluid flow through said fluid flow system may be regulated;

a fluid seal between said wall exit opening and said external opening of said cylinder.

2. The invention as defined in claim 1 including a delta pressure transducer mounted in said box unit for indicating the difference between the pressure in said space suit and the ambient water pressure around said suit, said pressure transducer having one surface in communication with said suit exhaust line connection and another surface adapted for exposure to the ambient water pressure around said suit.

3. The invention as defined in claim 1 including an emergency pressure relief valve mounted in said box unit, said valve having a surface in communication with said suit exhaust line connection and a surface adapted for exposure to the ambient water pressure around said suit, said valve having means for automatically opening when the pressure in said suit reaches a predetermined level.

* * * * *